United States Patent Office 2,713,951
Patented July 26, 1955

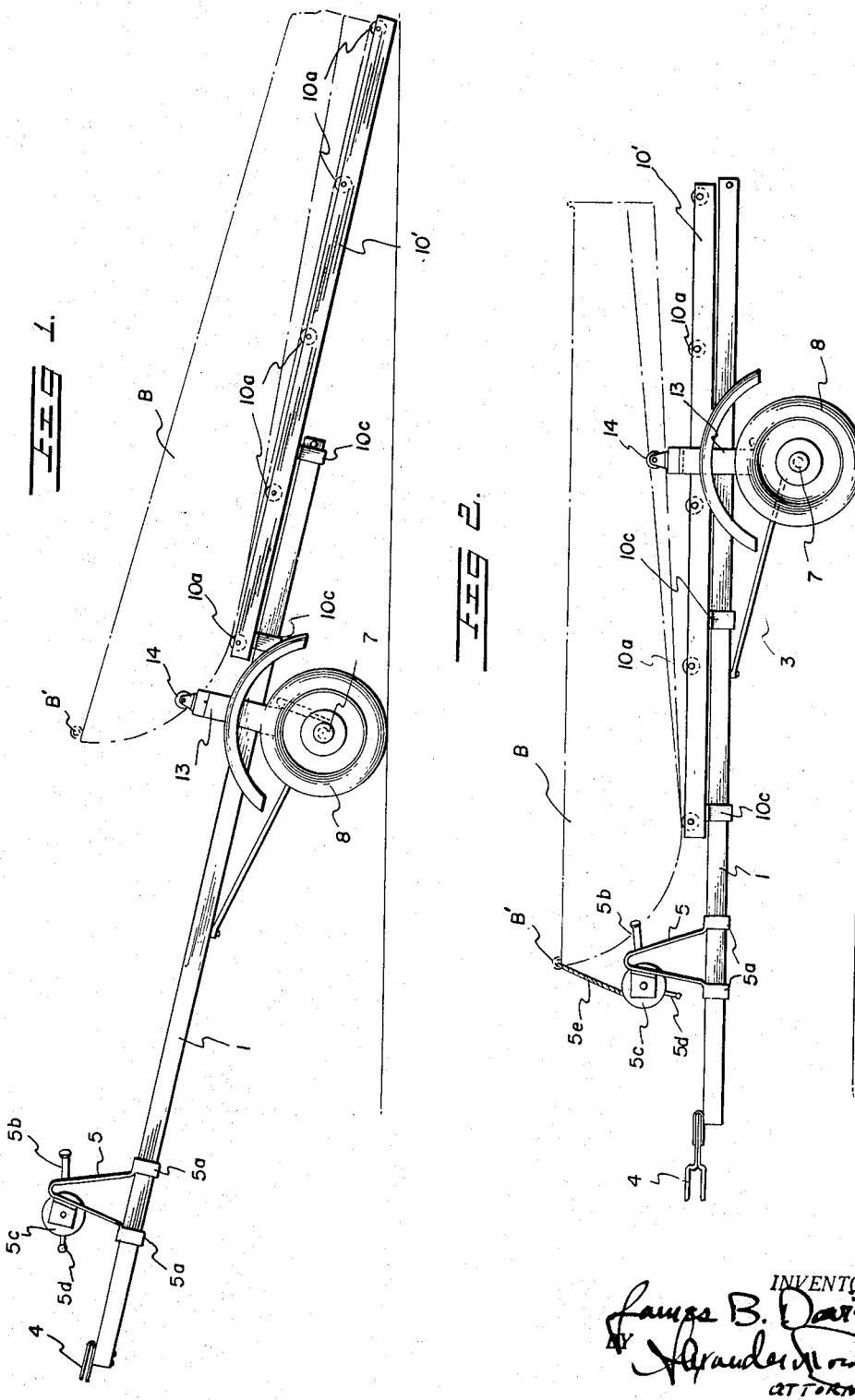

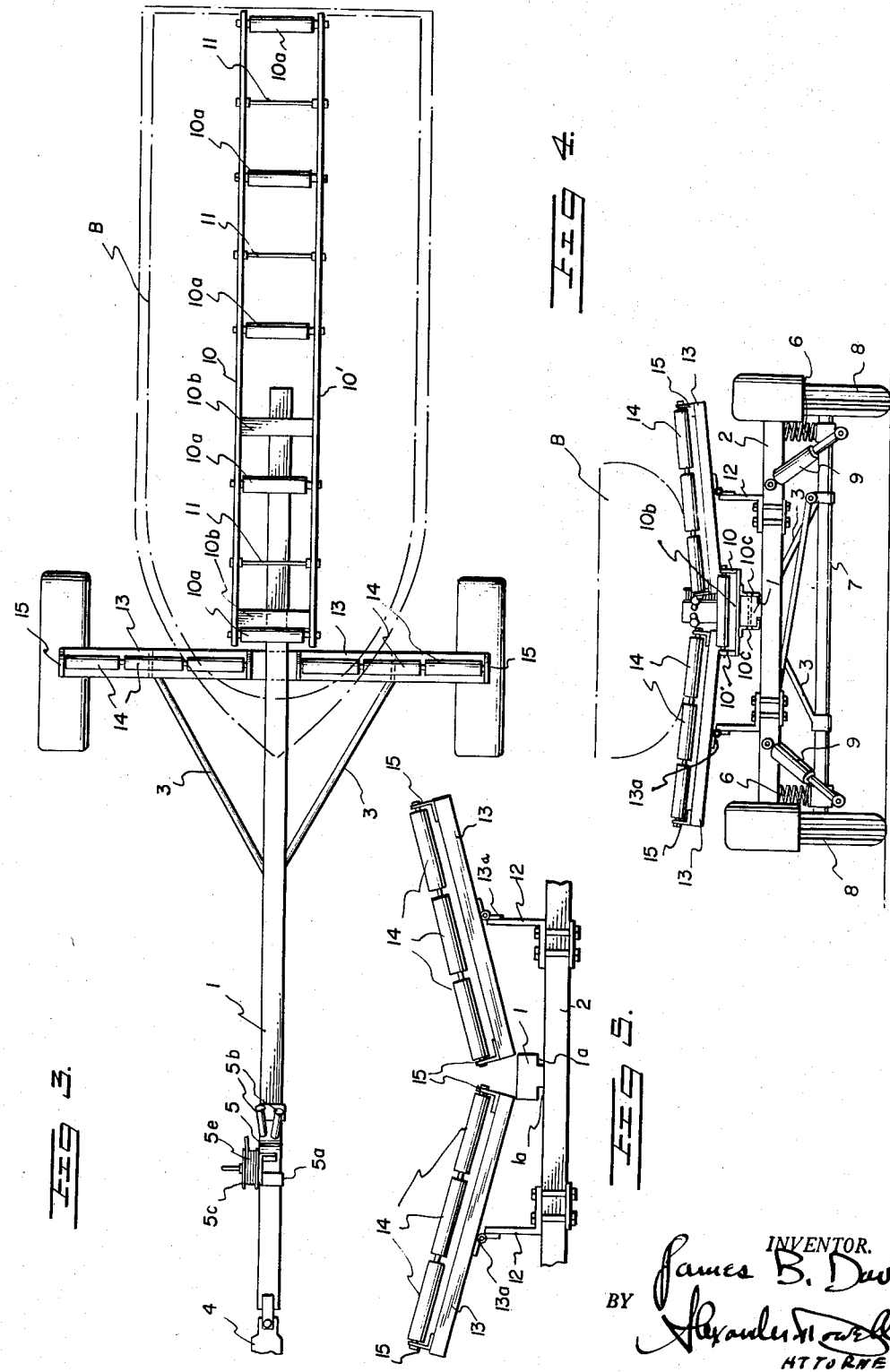

2,713,951

TRAILER ATTACHMENTS FOR LAUNCHING, TRANSPORTING, AND HANDLING SMALL BOATS

James B. Davies, New Orleans, La.

Application August 12, 1952, Serial No. 303,912

6 Claims. (Cl. 214—506)

This invention is a novel trailer attachment for launching, transporting and handling small boats; and the principal object thereof is to provide an attachment which may be mounted on existing trailers of appropriate capacity, employing a tubular, rectangular, or round tongue having a cross-piece adjacent the rear end of the tongue supported by ground wheels, the forward end of the tongue being adapted to be connected by a suitable hitch to the rear end of a towing vehicle.

Another object of the invention is to provide a trailer or trailer attachment which will provide a safe and easy means for launching, transporting and handling small boats without damage to the boat hull.

A further object of the invention is to provide a trailer or trailer attachment of the above type having an extension frame and cradle so designed that when the trailer is disengaged from the towing vehicle the boat carried by the trailer may be pushed down the inclined extension frame, the rocker arms of the cradle carried by the trailer forming a support for the boat so that the boat will remain steady on the extension frame, whereby the boat can be washed out or cleaned, the water being permitted to run out of a sea cock in the rear end of the boat bottom.

A still further object of the invention is to provide a boat trailer or trailer attachment of the above type, in which the rocker arms of the cradle will hold the boat steady on the inclined extension frame when the boat is being pulled out of or launched into the water, the rocker arms further steadying the boat on the trailer when the boat is fully supported on the trailer and when the trailer is attached to the towing vehicle.

Other minor objects of the invention will be hereinafter set forth.

I will explain the invention with reference to the accompanying drawings which illustrate one practical embodiment thereof to enable others familiar with the art to adopt and use the same, and will summarize in the claims the novel features of construction, and novel combinations of parts, for which protection is desired.

In said drawings:

Fig. 1 is a side elevation showing my novel trailer detached from a towing vehicle, and showing the extension frame pushed rearwardly with its rear end resting upon the ground surface, and showing in dot-and-dash lines a small boat positioned on the extension frame.

Fig. 2 is a side elevation similar to Fig. 1, but showing the extension frame in substantially horizontal position with the boat carried thereon, and showing the trailer in normal transporting position ready for attachment to a towing vehicle.

Fig. 3 is a top plan view of the parts shown in Fig. 1.

Fig. 4 is a rear end elevation of the trailer frame in the position shown in Fig. 2.

Fig. 5 is an enlarged end elevation of the cradle mounted on the cross member of the trailer frame.

As shown, my novel boat trailer preferably comprises a trailer frame having a tongue 1 provided adjacent its rear end with a cross member 2 secured thereto in any desired manner, the parts being preferably held in fixed relation by means of struts 3 or by other means. At the front end of tongue 1 is a trailer hitch 4 of conventional design whereby the tongue may be secured to the rear end of a towing vehicle.

Upon tongue 1 adjacent the front end thereof is an upwardly extending bracket 5 secured thereto by clips 5a or the like in fixed position thereon, said bracket 5 being conventional, but as shown being of substantially inverted V-shape and having on its rear leg adjacent the top thereof a pair of spaced lugs 5b adapted as shown in Fig. 2 to receive between them the pointed bow of the boat B shown in dot-and-dash lines in Fig. 2. The bracket 5 also carries a winch drum 5c mounted on a shaft rotated by a handle 5d whereby the winch drum may be rotated, said drum carrying a cable 5e which may be detachably attached to an eye or cleat B' at the bow of boat B, so that as the winch drum is rotated the boat will be moved forwardly on the trailer frame until the bow enters between the lugs 5b, thus centering the bow of the boat with relation to the tongue 1.

The cross member 2 is supported by springs 6 (Fig. 4) at each end upon an axle 7 carrying pneumatic or other tired wheels 8, suitable snubbers 9 being provided between the axle 7 and cross member 2 for maintaining axle 7 and cross member 2 in substantial parallel relation.

As shown in Fig. 5, tongue 1 is rectangular, and has undercut grooves 1a at its lower corners, for the purpose hereinafter described.

Axially slidably mounted upon tongue 1 is an extension frame consisting of spaced parallel bars 10 and 10' (Fig. 3), which are held in spaced relation by spacing bars 11. The extension frame also carries a spaced series of rollers 10a, five being shown in Fig. 3, said rollers extending slightly above the tops and the bars 10, 10', and being rotatably mounted upon shafts having their ends secured in the spaced bars 10, 10', the rollers 10a forming a means for supporting the keel of the boat B when the same is being pulled upwardly onto the trailer, or pushed rearwardly to lower the boat from the trailer onto the ground, the keel of the boat resting upon rollers 10a when the boat is in the position shown in Fig. 2.

The extension frame is slidably mounted upon tongue 2 by means of plates 10b (Fig. 3) carrying on their undersides guide plates 10c, Fig. 4, which are secured to the undersides of the plates 10b and which contact the sides of tongue 1, the lower ends of the guide plates 10c being flanged inwardly and sliding in the grooves 1a in the tongue 1, thereby preventing the extension frame from being lifted vertically off the tongue 1, but permitting the same to be moved axially thereof from the position shown in Fig. 2 to that shown in Fig. 1, and vice versa.

In order to stabilize the boat B on the trailer frame a cradle is provided on the cross member 2 shown more particularly in Fig. 5. The cradle comprises angle clips 12 (Fig. 5) which are securely clamped by bolts or the like fixedly upon the top of the cross member 2 at opposite sides of tongue 1. Upon the vertical leg of each clip 12 is a bar 13, the same being mounted thereon by means of hinges 13a as shown in Fig. 5 so as to be swingable in a horizontal plane. Upon each of the bars 13 are rollers 14 carried by rods mounted in angle clips 15 at each end of the bars 13. By the above construction the cradles 13 may pivot horizontally on the hinges 13a as boat B is drawn over the cradle, the rollers 14 thus conforming with the curvature, dead rise, pitch or shape of the hull of the boat B.

Preferably the rollers 10a and 14 are rubber covered so as to prevent damage to the paint or material of the boat hull.

By the above invention, when the trailer is unhitched from the towing vehicle, the boat carried on the extension frame 10—10'—11 may be pushed rearwardly into the position shown in Fig. 1, with the rear end of the extension frame resting on the ground surface. In this position the boat on the inclined frame can be washed and the water within the boat permitted to drain off through a sea cock in the boat hull, not shown. In this same position, the boat B may be pushed further rearwardly on the rollers 10a so as to clear the extension frame and thus be launched into the water; or by attaching the end of cable 5e to the eye B' of the boat, the boat can be pulled out of the water and onto the extension frame into the position shown in Fig. 1. Further tightening of cable 5e will draw the boat upwardly on the extension frame and then forwardly onto the tongue 1 into the position shown in Fig. 2 until the bow of the boat extends between the lugs 5b, in which position the winch can be locked, and the hitch 4 attached to a towing vehicle and the boat transported to another destination. As the boat is pulled forwardly with respect to the tongue 1 the cradle 13—14 will conform with the curvature or angularity or pitch of the sides of the boat and will fully support the boat therein, preventing the boat from moving laterally of the trailer as the cradle will generaly assume in most instances a V-shape with respect to the bottom of the usual small boat hull. After the boat has been positioned on the cradle the extension frame may then be manually pushed from the position shown in Fig. 1 onto the tongue 1, i. e., into the position shown in Fig. 2.

The above construction provides a simple, novel and efficient means for launching, transporting and handling small boats.

I do not limit my invention to the exact form shown in the drawings, for obviously changes may be made therein within the scope of the claims.

I claim:

1. In combination with a towing vehicle, a boat-carrying trailer adapted to be drawn by said vehicle and having a tongue and having a wheeled supported frame including a cross-piece connected with the tongue; a pair of transversely aligned rocker arms freely pivotally mounted intermediate their ends on said cross-piece and adapted to freely rockably engage the bottom of said boat carried by the trailer frame, the pivotal mounting of said rocker arms permitting same to freely conform with the pitch of the boat bottom; an extension frame longitudinally slidably mounted on the trailer tongue in rear of the trailer wheels and adapted in one position to underlie the boat supported on the trailer frame, and in another position to have its rear end resting on the ground with its front end disposed substantially opposite the said rocker arms to provide a skid whereby the boat may be pulled up the extension frame onto the rocker arms or discharged onto the ground from said rocker arms when said extension frame is positioned in said other position; and means on said trailer frame for pulling the boat onto the extension frame and onto the rocker arms when the extension frame is disposed in said other position.

2. In a combination as set forth in claim 1, said extension frame including guide members slidably engaging said tongue; said extension frame including parallel side members spaced apart and having spaced transversely disposed rollers journaled therein adapted to engage the bottom of the boat.

3. In a combination as set forth in claim 1, said pulling means comprising a winch on said trailer tongue in advance of the rocker arms and operating a rope adapted to be attached to an end of the boat.

4. In combination with a towing vehicle, a boat-carrying trailer adapted to be drawn by said vehicle and having a tongue and having a wheeled supported frame including a cross-piece; a pair of transversely aligned rocker arms pivotally mounted on said cross-piece; a pair of transversely aligned rollers carried by said rocker arms respectively and adapted to engage the bottom of said boat carried by the trailer frame, the pivotal mounting of said rocker arms permitting same to conform with the pitch of the boat bottom; an extension frame longitudinally slidably mounted on the trailer tongue in rear of the trailer wheels and adapted in one position to underlie the boat supported on the trailer frame, and in another position to have its rear end resting on the ground with its front end disposed substantially opposite the said trailer rollers to provide a skid whereby the boat may be pulled up the extension frame onto the rollers or discharged onto the ground from said rollers when said extension frame is positioned in said other position; and means on said trailer frame for pulling the boat onto the extension frame and onto the trailer rollers when the extension frame is disposed in said other position.

5. In a combination as set forth in claim 4, said extension frame including guide members slidably engaging said tongue; said extension frame also including parallel side members spaced apart and having spaced transversely disposed rollers journaled therein adapted to engage the bottom of the boat.

6. In a combination as set forth in claim 4, said pulling means comprising a winch on said trailer tongue in advance of the trailer rollers and operating a rope adapted to be attached to an end of the boat.

References Cited in the file of this patent

UNITED STATES PATENTS

| | | |
|---|---|---|
| 151,253 | Tothammer et al. | May 26, 1874 |
| 2,086,160 | Gotthardt et al. | July 6, 1937 |
| 2,332,991 | Commire | Oct. 26, 1943 |
| 2,374,383 | Sampsell | Apr. 24, 1945 |
| 2,485,793 | Vassar | Oct. 25, 1949 |
| 2,496,599 | Rivers | Feb. 7, 1950 |
| 2,554,398 | Brei | May 22, 1951 |
| 2,558,418 | Brueckman | June 26, 1951 |
| 2,571,213 | Cunningham et al. | Oct. 16, 1951 |
| 2,572,636 | Le Tourneau | Oct. 23, 1951 |
| 2,586,485 | Schroeder | Feb. 19, 1952 |
| 2,588,001 | Holland | Mar. 4, 1952 |
| 2,608,314 | Krider | Aug. 26, 1952 |
| 2,613,827 | Van Doorne | Oct. 14, 1952 |
| 2,660,443 | Miller | Nov. 24, 1953 |

FOREIGN PATENTS

| | | |
|---|---|---|
| 496,549 | Great Britain | Nov. 28, 1938 |